United States Patent
Sakai et al.

(10) Patent No.: US 12,435,756 B2
(45) Date of Patent: Oct. 7, 2025

(54) DUSTPROOF SEAL STRUCTURE

(71) Applicant: Mitutoyo Corporation, Kanagawa (JP)

(72) Inventors: Hisayoshi Sakai, Kanagawa (JP); Tsutomu Ugajin, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 245 days.

(21) Appl. No.: 18/365,320

(22) Filed: Aug. 4, 2023

(65) Prior Publication Data

US 2024/0063680 A1 Feb. 22, 2024

(30) Foreign Application Priority Data

Aug. 18, 2022 (JP) ................. 2022-130326

(51) Int. Cl.
*F16C 33/74* (2006.01)
*F16C 17/04* (2006.01)

(52) U.S. Cl.
CPC .......... *F16C 17/045* (2013.01); *F16C 33/748* (2013.01)

(58) Field of Classification Search
CPC .... F16C 32/0614; F16C 33/748; F16C 33/72; F16C 32/0622; F16C 32/0625
See application file for complete search history.

(56) References Cited

U.S. PATENT DOCUMENTS

2018/0299247 A1   10/2018   Honda et al.

FOREIGN PATENT DOCUMENTS

| EP | 0343044 A1 | * | 11/1989 | .......... F16C 32/0614 |
| JP | S61-091624 U | | 3/1986 | |
| JP | 2004225740 A | * | 8/2004 | .............. F16C 43/02 |
| JP | 2018-179849 A | | 11/2018 | |
| KR | 20070070363 A | * | 7/2007 | ............... B23Q 5/54 |

* cited by examiner

*Primary Examiner* — John Olszewski
*Assistant Examiner* — Aimee Tran Nguyen
(74) *Attorney, Agent, or Firm* — Rankin, Hill & Clark LLP

(57) ABSTRACT

A dustproof seal structure includes a rotor assembly and a stator assembly rotatably supporting the rotor assembly. The stator assembly forms a horizontal thrust aerostatic bearing between a lower surface of the thrust plate and an upper surface of the stator assembly when compressed air is supplied between the lower surface of the thrust plate and the upper surface of the stator assembly. The thrust plate and the stator assembly form a sealing portion through which the compressed air flows. The sealing portion includes an inclined flow path whose height increases from an outer peripheral surface of the thrust plate toward the inside in a radial direction.

16 Claims, 7 Drawing Sheets

DUSTPROOF SEAL STRUCTURE

CROSS-REFERENCE TO RELATED APPLICATIONS

The present application claims priority to Japanese Patent Applications number 2022-130326, filed on Aug. 18, 2022. The contents of this application are incorporated herein by reference in their entirety.

BACKGROUND OF THE INVENTION

Conventionally, in a three-dimensional measuring machine in which a space to be measured is formed by three-axis orthogonal coordinates, in particular, in the case of measuring an object to be measured having a rotating shaft such as a roller or a gear with high accuracy, a rotary table is used as a fourth axis. Japanese Unexamined Utility Model (Registration) Application Publication No. 61-91624 discloses a radial, static-pressure aerostatic bearing that is barely affected by a foreign substance such as dust or rust.

The rotary table including an air bearing is advantageous in ensuring high rotational accuracy. However, the entry of dust or a foreign substance into a bearing gap of the air bearing from the outside lowers the rotational performance of the rotary table, and may damage a bearing guide surface in some cases.

BRIEF SUMMARY OF THE INVENTION

Accordingly, the present disclosure has been made in view of these points, and its object is to provide a dustproof seal structure that prevents dust or a foreign substance from easily entering a bearing gap of an air bearing and maintains the rotational performance of a rotary table over a long period of time.

A dustproof seal structure of the present disclosure includes: a rotor assembly having a disc-shaped thrust plate and a columnar rotor provided on a lower surface of the thrust plate; a stator assembly rotatably supporting the rotor assembly, wherein the stator assembly forms a horizontal thrust aerostatic bearing between the lower surface of the thrust plate and an upper surface of the stator assembly when compressed air is supplied between the lower surface of the thrust plate and the upper surface of the stator assembly, wherein the thrust plate and the stator assembly form a sealing portion through which compressed air flows, at a position radially outward from the thrust aerostatic bearing, and the sealing portion includes an inclined flow path whose height increases from an outer peripheral surface of the thrust plate toward the inside in a radial direction.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

A dustproof seal structure of the present embodiment includes i) a rotor assembly having a disc-shaped thrust plate and a columnar rotor provided on a lower surface of the thrust plate, and ii) a stator assembly rotatably supporting the rotor assembly. The stator assembly forms a horizontal thrust aerostatic bearing between the lower surface of the thrust plate and an upper surface of the stator assembly when compressed air is supplied between the lower surface of the thrust plate and the upper surface of the stator assembly. The thrust plate and the stator assembly form a sealing portion through which compressed air flows at a position radially outward from the thrust aerostatic bearing. The sealing portion has an inclined flow path whose height increases from an outer peripheral surface of the thrust plate toward the inside in a radial direction.

First Example

Figure 1:
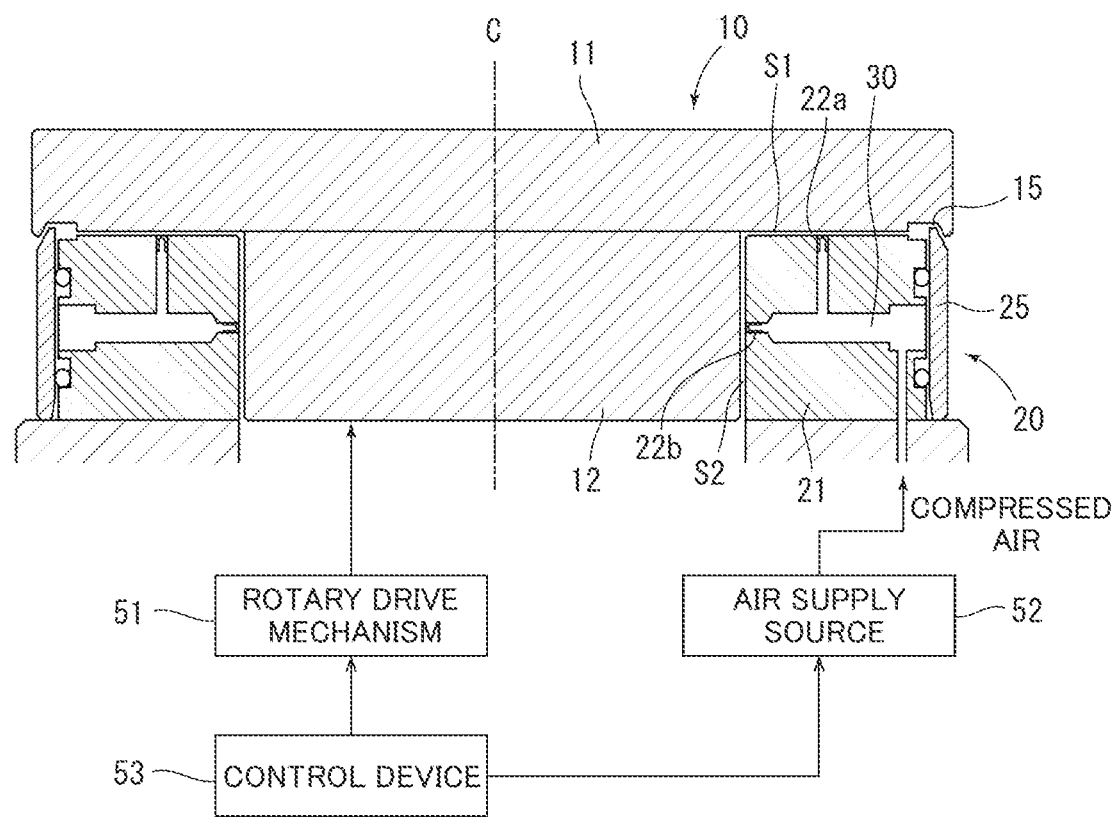
FIG. 1 is a cross-sectional view showing a rotary table according to an embodiment of the present disclosure.
Figure 2:
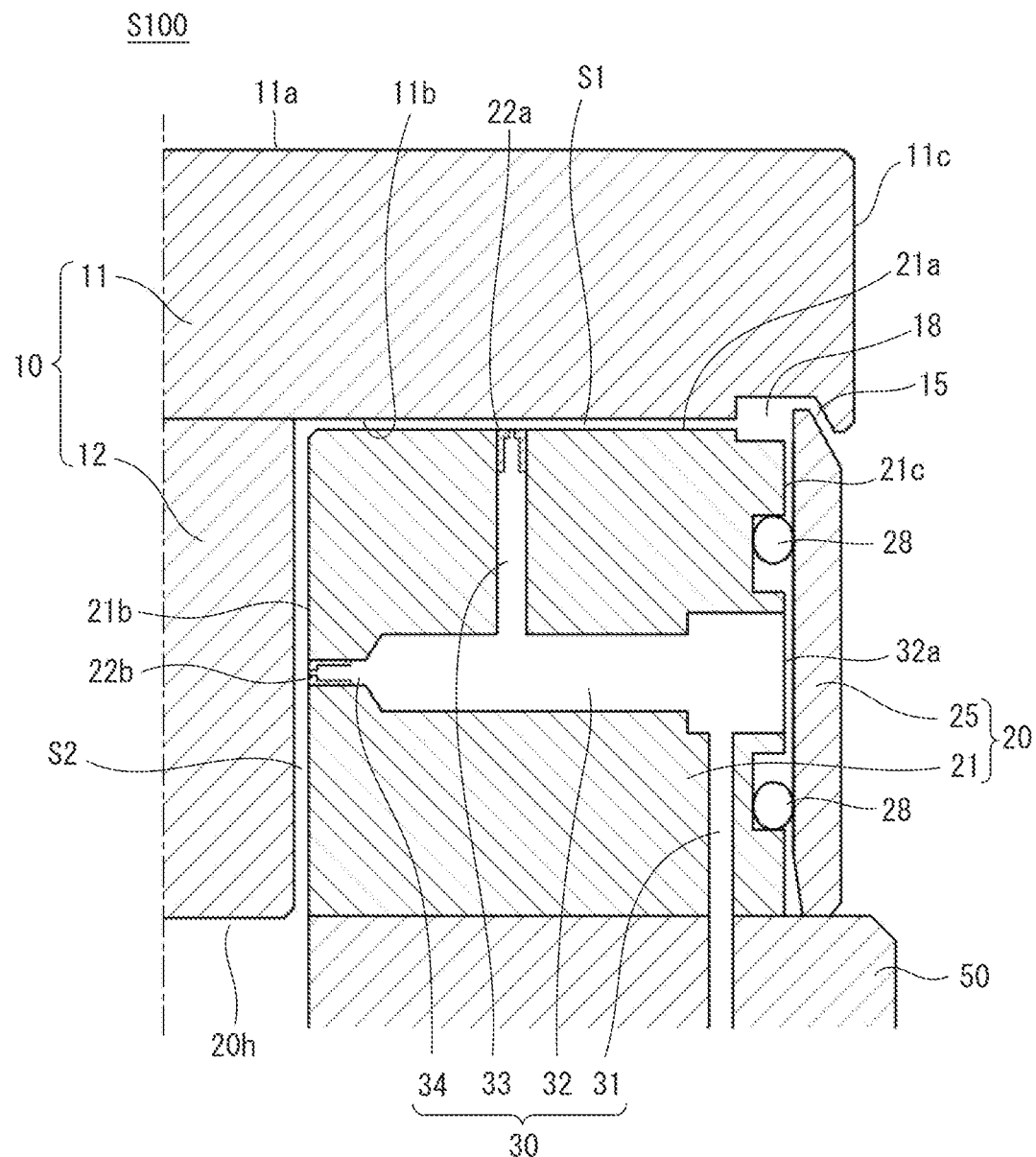
FIG. 2 is an enlarged view of a portion of FIG. 1.

Hereinafter, the first to third examples will be described, but in each example, structural parts having the same function are denoted by the same or corresponding reference numerals. FIG. 1 is a cross-sectional view showing a rotary table according to an embodiment of the present disclosure. FIG. 2 is an enlarged view of a portion of FIG. 1. Although various types of dust or a foreign substance are assumed to enter an air bearing portion of the rotary table, the following mainly describes sealability against, for example, oil flowing down from an upper surface of the rotary table or oil mist floating in the air.

[Outline of the Rotary Table of the Present Embodiment]

As shown in FIG. 1, a rotary table S100 of the present embodiment includes a rotor assembly 10, a stator assembly 20, a rotary drive mechanism 51, an air supply source 52, and a control device 53. A thrust aerostatic bearing S1 and a radial aerostatic bearing S2 are formed between the rotor assembly 10 and the stator assembly 20. The rotor assembly 10 is configured to rotate around a rotation axis C.

In this type of rotary table, for example, oil may flow down from an upper surface of the rotor assembly 10, and may enter the thrust aerostatic bearing S1 between the rotor assembly 10 and the stator assembly 20. In the rotary table S100 of the present embodiment, a ring-shaped sealing portion 15 is formed at a position radially outward from the thrust aerostatic bearing S1, and this sealing portion 15 functions as a dustproof seal structure. Such a sealing portion 15 prevents oil from entering the thrust aerostatic bearing S1.

[Configurations of Each Part]

The rotor assembly 10 includes a disc-shaped thrust plate 11 and a rotor 12. The rotor assembly 10 rotates around the rotation axis C extending in the vertical direction.

As shown in FIG. 2, the thrust plate 11 has an upper surface 11a, a lower surface 11b, and an outer peripheral surface 11c. The upper surface 11a is a horizontal placement surface where a predetermined object is placed. The lower surface 11b is, for example, a horizontal surface, and a columnar rotor 12 is fixed to a central portion of the lower surface 11b. As an example, the outer peripheral surface 11c extends in the vertical direction.

The stator assembly 20 includes a stator 21, a sleeve 25, and an O-ring 28. The stator assembly 20 is fixed onto a base 50.

The stator 21 is an annular member forming a circular recessed portion 20h in which the rotor 12 is disposed. The stator 21 has an upper surface 21a, an inner peripheral surface 21b, and an outer peripheral surface 21c. The upper surface 21a is a horizontal surface facing the lower surface lib. The inner peripheral surface 21b is a surface facing an outer peripheral surface of the rotor 12, and the outer peripheral surface 21c is a surface facing an inner peripheral surface of the sleeve 25.

An air path 30 for supplying compressed air to the thrust aerostatic bearing S1 and the radial aerostatic bearing S2 is formed inside the members of the stator 21. In the present embodiment, the air path 30 includes a first path 31, a second path 32, a third path 33, and a fourth path 34.

The first path 31 is a path for supplying compressed air from the air supply source 52 (FIG. 1) to the second path 32. An outer peripheral air supply groove 32a is formed radially outward from the second path 32. O-rings 28 are disposed above and below the outer peripheral air supply groove 32a. The O-ring 28 has a ring shape surrounding the stator 21. The O-ring 28 provides a seal between the outer peripheral surface 21c of the stator 21 and the inner peripheral surface of the sleeve 25.

The third path 33 supplies the compressed air from the second path 32 to the upper surface 21a of the stator 21. The fourth path 34 supplies the compressed air from the second path 32 to the inner peripheral surface 21b of the stator 21. As illustrated in FIG. 2, an air supply restrictor 22a, which is open to the upper surface 21a of the stator 21 and adjusts a supply amount of air from the third path 33, may be disposed in the third path 33. Similarly, an air supply restrictor 22b, which is open to the inner peripheral surface 21b of the stator 21 and adjusts a supply amount of air from the fourth path 34, may be disposed in the fourth path 34. These air supply restrictors 22b may be disposed circumferentially around the rotation axis C (FIG. 1), for example.

The sleeve 25 is an annular member disposed radially outward from of the stator 21. For example, the sleeve 25 is substantially the same height as the stator 21, or slightly higher than the stator 21. An upper surface of the sleeve 25 cooperates with the lower surface 11b of the thrust plate 11 to form the sealing portion 15. The outer peripheral surface of the sleeve 25 may be positioned at the same position as the outer peripheral surface 11c of the thrust plate 11, but in the present embodiment, the outer peripheral surface of the sleeve 25 is positioned radially inward from the outer peripheral surface 11c.

As described above in the present embodiment, although the stator 21 and the sleeve 25 form the stator assembly 20, the stator assembly 20 may be a single member. For example, instead of using an upper surface portion of the sleeve 25 to form a flow path of the sealing portion 15, structural parts for forming a flow path may be provided in the vicinity of an outer peripheral portion of the stator. Specifically, an annular member may be provided on the bottom surface of a cavity or radially outward from the cavity.

The air supply source 52 (FIG. 1) is a compressor, for example, and supplies compressed air to the air path 30. The operation of the air supply source 52 is controlled by the control device 53, for example.

The rotary drive mechanism 51 is a mechanism for rotating the rotor assembly 10. Although not shown, the rotary drive mechanism 51 includes a drive source such as a motor, and a transmission mechanism that transmits output from the motor. The operation of the rotary drive mechanism 51 is controlled by the control device 53, for example.

(Action of Air Bearings and Rotation of the Rotor Assembly 10)

In the rotary table S100 configured as described above, the thrust aerostatic bearing S1 and the radial aerostatic bearing S2 are formed when compressed air is delivered between the rotor assembly 10 and the stator assembly 20 from the air supply source 52 via the air path 30.

The thrust aerostatic bearing S1 is a static pressure air film formed due to compressed air supplied between the upper surface 21a of the stator 21 and the lower surface 11b of the thrust plate 11. This static pressure air film functions as a horizontal air bearing.

An air bearing of the rotary table S100 is formed as an air film of several micrometers to tens of micrometers (microns) between the rotor assembly 10 serving as a rotating side and the stator assembly 20 as a fixed side. The stiffness of the air film allows the rotor assembly 10 to be supported by the stator assembly 20 in a non-contact manner.

The radial aerostatic bearing S2 is a vertical air bearing formed as a static pressure air film between the inner peripheral surface 21b (FIG. 2) of the stator 21 and the outer peripheral surface of the rotor 12. The radial aerostatic bearing S2 has a function of controlling radial deflection of the rotor assembly 10.

Since the rotary drive mechanism 51 rotates the rotor assembly 10 in a predetermined direction while compressed air is supplied from the air supply source 52, the rotor assembly 10 rotates in a non-contact manner with respect to the stator assembly 20. The air supply source 52 is equipped with a powerful air filter, which removes dust with a particle diameter of 0.01 µm or more with a collection efficiency of 99.9%. Therefore, the air supplied to the thrust aerostatic bearing S1 and the radial aerostatic bearing S2 is extremely clean.

(Configuration of the Sealing Portion)

Figure 3:
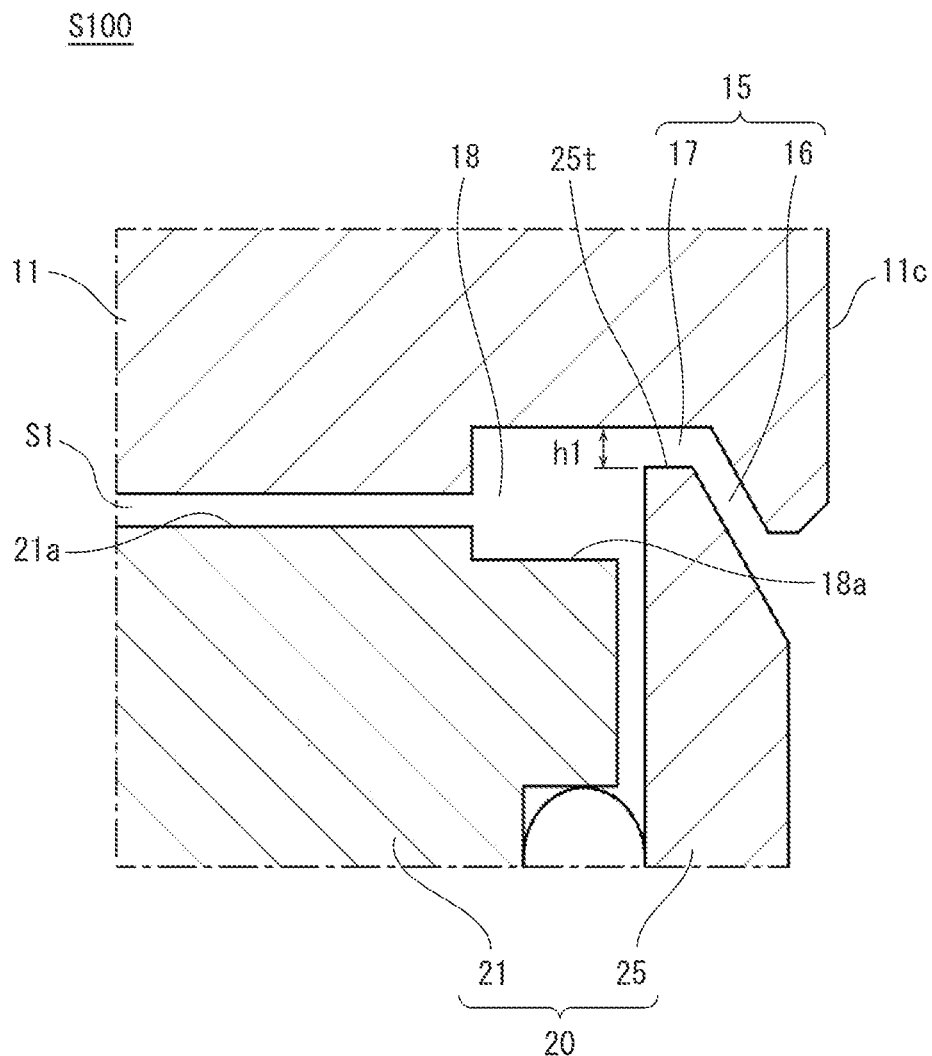
FIG. 3 is an enlarged view of a portion of FIG. 2.

Next, the sealing portion 15 and its surrounding structure will be described while referencing FIG. 3. FIG. 3 is an enlarged view of a portion of FIG. 2. The sealing portion 15 and its surrounding structure are formed by the thrust plate 11 and the stator assembly 20, and are positioned radially outward from the thrust aerostatic bearing S1.

The sealing portion 15 is an air sealing portion formed between the lower surface 11b of the thrust plate 11 and the upper surface of the sleeve 25. As shown in FIG. 3, the sealing portion 15 includes an inclined flow path 16 and a connecting portion 17. A cavity 18 is formed radially inward from the sealing portion 15.

The inclined flow path 16 has an inclined flow path so as to prevent oil or the like from easily entering from the outside. Specifically, the inclined flow path 16 is formed such that the height of the flow path increases from the outer peripheral surface 11c of the thrust plate 11 toward the inside in a radial direction. In the present embodiment, the inclined flow path 16 is a linear flow path, but the inclined flow path 16 may be a curved flow path or a stepped flow path. In the example of FIG. 3, the highest portion 25t of the upper surface of the sleeve 25 is positioned above the thrust aerostatic bearing S1. This structure is advantageous in that oil or the like is less likely to enter the thrust aerostatic bearing S1 from the outside.

In the present embodiment, as an example, an upper end surface of the sleeve 25 is positioned above the thrust aerostatic bearing S1, and therefore an end portion of the inclined flow path 16 opposed to an inlet side is positioned above the thrust aerostatic bearing S1. The connecting portion 17 is a flow path connecting the inclined flow path 16 and the cavity 18. The connecting portion 17 extends radially from the end portion of the inclined flow path 16 opposed to the inlet side, for example.

The cavity 18 is provided at a position between the thrust aerostatic bearing S1 and the sealing portion 15. The cavity 18 is formed by, for example, the thrust plate 11, the stator 21, and the sleeve 25. The cavity 18 is a space for capturing dust or a foreign substance. For example, a lower surface 18a of the cavity 18 is formed lower than the upper surface 21a of the stator 21 of the stator assembly 20. Even if a certain amount of dust or a foreign substance enters the cavity 18, such a configuration prevents the dust or foreign substance from entering the inside of the thrust aerostatic bearing S1 until the dust or foreign substance reaches the upper surface 21a.

As understood from FIG. 3, the cavity 18 communicates with both the thrust aerostatic bearing S1 and the sealing portion 15. During the operation of the rotary table S100, compressed air discharged from an outer peripheral portion of the thrust aerostatic bearing S1 passes through the cavity 18 and flows into the sealing portion 15.

In consideration of maintaining the inside of the cavity 18 at a positive pressure and the difficulty of processing, a sealing portion gap h1 in a state where compressed air is supplied is formed to be about 0.1 mm to 0.5 mm, for example. The height of the sealing portion gap h1 is greater than the height of a bearing gap of the thrust aerostatic bearing S1.

In the present embodiment, although not shown, a water-repellent coating layer is formed on at least a portion of a region of the rotor assembly 10 and the stator assembly 20 facing the sealing portion 15, for example. The water-repellent coating layer is formed by surface treatment for impregnating a target member with polytetrafluoroethylene (PTFE), for example. A portion provided with such a water-repellent coating layer is less likely to get wet from a liquid, and a contact angle of liquid exceeds 90°, for example. When the contact angle of the liquid on a solid surface is more than 90°, capillary action is less likely to occur, and thus it is possible to prevent the entry of liquid such as water or oil.

(Action by the Sealing Portion 15)

During the operation of the rotary table S100, compressed air supplied to the thrust aerostatic bearing S1 is discharged from the outer peripheral portion of the thrust aerostatic bearing S1 and supplied to the cavity 18 and the sealing portion 15. In this manner, the sealing portion 15 is supplied with the compressed air, thereby functioning as an air sealing portion.

Figure 4:
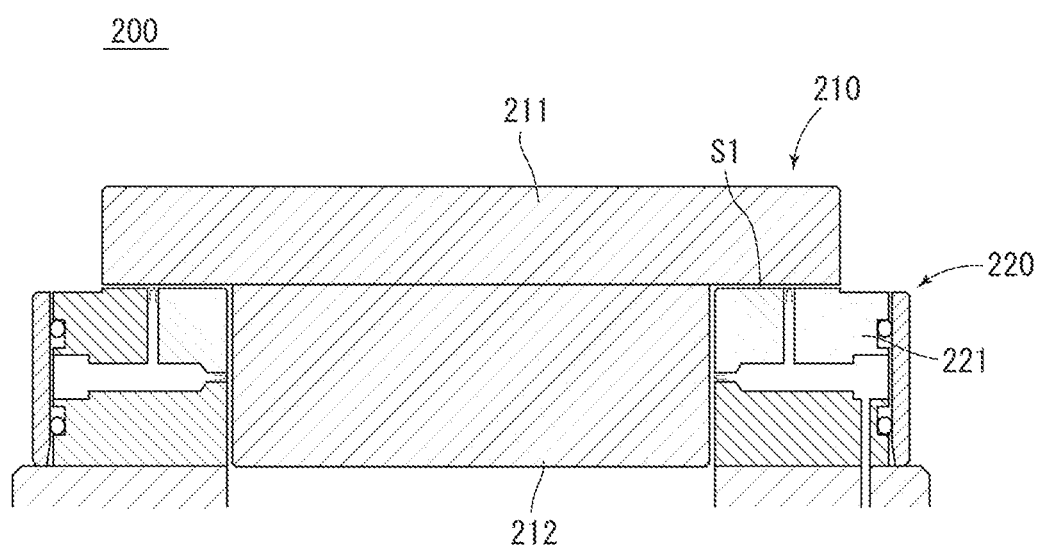
FIG. 4 is a cross-sectional view showing a rotary table of a comparative example.

In the rotary table S100, it is assumed that, for example, oil flows down from the upper surface of the thrust plate 11 along the outer peripheral surface 11c. FIG. 4 is a cross-sectional view showing a rotary table of a comparative example. A rotary table 200 of FIG. 4 has a configuration similar to the configuration of the present embodiment in that a rotor assembly 210 including a thrust plate 211 and a rotor 212 is rotatably supported by a stator assembly 220. However, a "sealing portion" as in the present embodiment is not formed between the thrust plate 211 and the stator 221.

In this configuration, oil flowing from an upper surface of the thrust plate 211 may enter the thrust aerostatic bearing S1.

On the other hand, in the rotary table S100 of the present embodiment, as shown in FIG. 3, the sealing portion 15 includes the inclined flow path 16, and this inclined flow path 16 is formed such that the flow path is inclined. Therefore, even if oil reaches the inlet of the inclined flow path 16, the oil is less likely to flow into the inclined flow path 16. In addition, not only is the flow path inclined, but also compressed air is supplied to the inclined flow path 16, and the inclined flow path 16 is at a positive pressure. Thus, it is possible to prevent oil from entering the flow path more effectively. As a result, it is possible to prevent oil from entering the cavity 18 or the thrust aerostatic bearing S1.

Although the above describes the entry of oil, it is possible to prevent other dust or a foreign substance from entering the thrust aerostatic bearing S1.

Although an embodiment of the present disclosure has been described while referencing the drawings, the present disclosure is not limited to the specific structure described above. For example, the stator assembly 20 need not include the sleeve 25, and the stator 21 and the thrust plate 11 may form the sealing portion 15. Although the cavity 18 is provided in the above embodiment, the rotary table according to an embodiment of the present disclosure need not have a configuration corresponding to the cavity 18.

(Effect of the Rotary Table S100)

In the rotary table S100 of the present embodiment as described above, the sealing portion 15 is formed radially outward from the thrust aerostatic bearing S1. The sealing portion 15 includes the inclined flow path 16 and is configured such that compressed air flows therethrough. Therefore, dust or a foreign substance is less likely to enter the sealing portion 15 from the outside. As a result, it is possible to prevent dust or a foreign substance from entering the thrust aerostatic bearing S1. Accordingly, the rotational performance of the rotary table S100 can be maintained over a long period of time.

In the rotary table S100, in a non-operation state where the supply of compressed air is stopped, the upper surface 21a of the stator 21 and the lower surface 11b of the thrust plate 11 are in solid contact with each other, and an apparent bearing gap becomes zero. When there is dust or a foreign substance between the thrust plate 11 and the stator 21 in this state, the dust or foreign substance may cause sticking between the thrust plate 11 and the stator 21. However, the air supply source 52 is provided with a powerful air filter, and the rotary table S100 of the present embodiment prevents the entry of dust or a foreign substance into the thrust aerostatic bearing S1 from the outside, thereby inhibiting such problems.

In the configuration of the present embodiment, compressed air is supplied to the cavity 18 and the sealing portion 15 to generate a positive pressure. Therefore, a pressure-receiving area of the thrust plate 11 receiving the pressure of compressed air increases, and the loadable weight on a board face of the thrust plate 11 can be increased.

In the configuration of the present embodiment, a cavity 18 is formed between the sealing portion 15 and the thrust aerostatic bearing S1. The lower surface 18a of the cavity 18 is lower than the upper surface 21a of the stator 21 forming the thrust aerostatic bearing S1. Therefore, even if dust or a foreign substance enters the cavity 18, the dust or foreign substance is captured in the cavity 18, and less likely to enter the thrust aerostatic bearing S1.

In the configuration of the present embodiment, the outer peripheral surface 11c of the thrust plate 11 is positioned radially outward from the inclined flow path 16. Therefore, even if, for example, oil flows down along the outer peripheral surface 11c, the oil is less likely to enter the inclined flow path 16.

Further, in the configuration of the present embodiment, the sealing portion 15 is provided such that compressed air discharged from the thrust aerostatic bearing S1 flows into the sealing portion 15. As described above, dust or a foreign substance is less likely to enter the sealing portion 15 due to compressed air supplied to the sealing portion 15, but as in the present embodiment, the configuration in which compressed air discharged from the thrust aerostatic bearing S1 is delivered to the sealing portion 15 can simplify the structure. Specifically, it is not necessary to form a dedicated supply flow path for supplying compressed air to the cavity 18 or the sealing portion 15, for example.

It is not essential in the present disclosure that the sealing portion 15 is formed between the sleeve 25 and the thrust plate 11. However, as in the above embodiment, the configuration in which the sealing portion 15 is formed by a portion of the sleeve 25, which is a separate member from the stator 21, has the following advantages. Specifically, since the shape of the sealing portion 15 can be defined by processing a portion of the sleeve 25, which can be fabricated as a smaller component than the stator 21, a processing operation is easier than in the case of processing a portion of the stator 21.

In the configuration of the present embodiment, a water-repellent coating layer is formed on at least a portion of a region of the thrust plate 11 or the stator assembly 20 facing the sealing portion 15. The water repellency of this coating layer prevents oil or the like from entering the sealing portion 15.

Second Example

Figure 5:
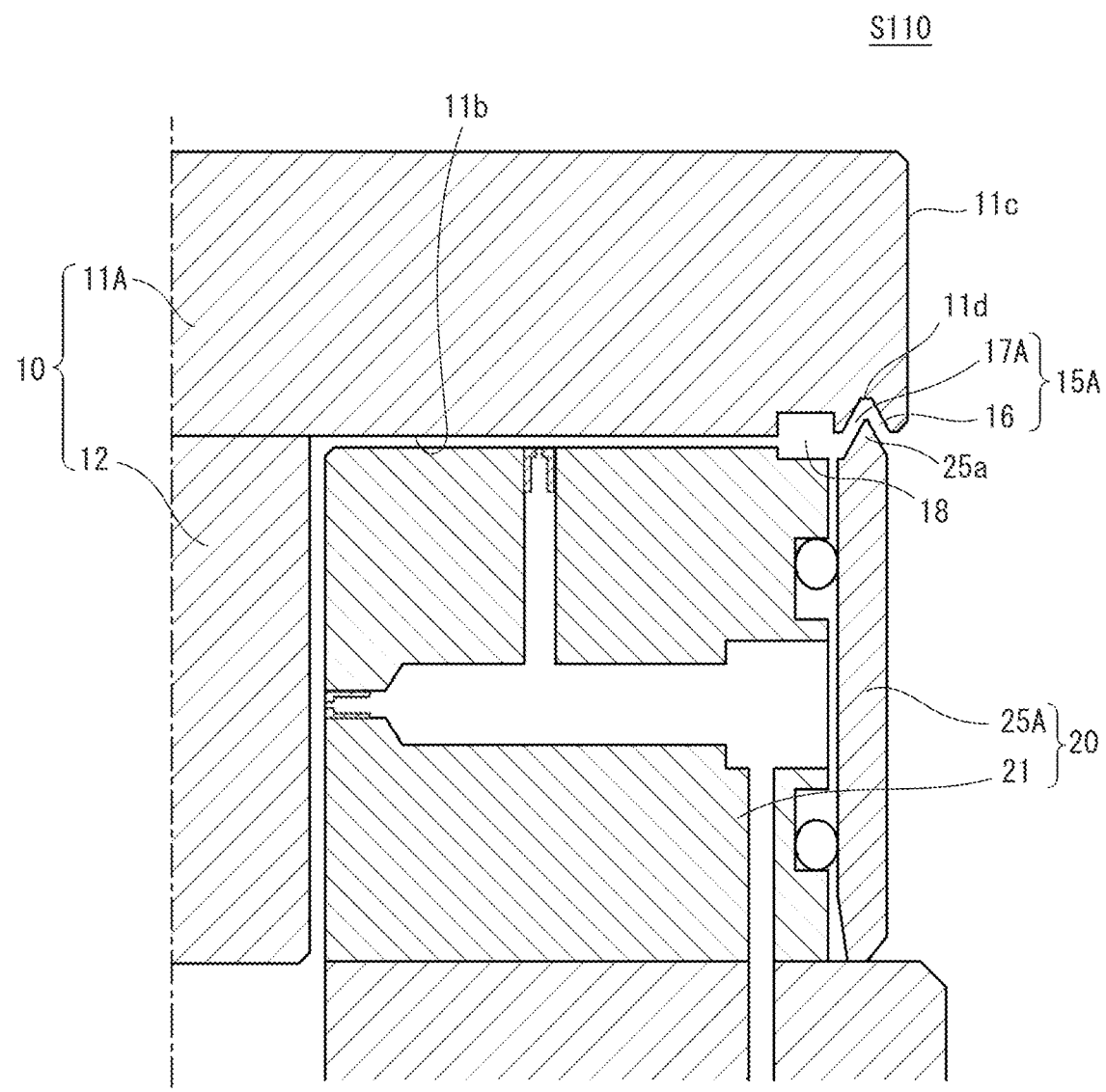
FIG. 5 is a cross-sectional view showing a configuration of the second example.

A cross-sectional shape of the sealing portion constituting the dustproof seal structure of the present disclosure can be changed to a variety of shapes, in addition to the shape as in the above embodiment. FIG. 5 is a cross-sectional view showing a configuration of the second example.

A rotary table S110 of FIG. 5 includes a sealing portion 15A having a shape different than that of the sealing portion 15 of the first example. The other configurations are similar to those of the first example. The rotary table S110 includes a rotor assembly 10 and a stator assembly 20. The rotor assembly 10 includes a thrust plate 11A and a rotor 12. The stator assembly 20 includes a stator 21 and a sleeve 25A.

As shown in FIG. 5, the sealing portion 15A includes a flow path portion formed in a ridge shape (inverted V shape) when viewing a vertical cross section of the sealing portion 15A. Specifically, the sealing portion 15A includes an inclined flow path 16 and a connecting portion 17A.

As in the first example, the inclined flow path 16 is a flow path whose height increases from an outer peripheral surface 11c of the thrust plate 11A toward the inside in a radial direction. The connecting portion 17A is a flow path connecting the inclined flow path 16 and a cavity 18, and the height of the flow path decreases from the inclined flow path 16 toward the cavity 18. In the present embodiment, the inclined flow path 16 and the connecting portion 17A form a flow path portion having a ridge-shaped cross section as shown in FIG. 5.

Specifically, a ridge-shaped flow path portion is formed between a convex portion 25a formed on an upper end of the sleeve 25 and a concave portion 11d formed on a lower surface 11b of the thrust plate 11. Although the whole shape is not shown, both the convex portion 25a and the concave portion 11d have an annular shape around the rotation axis C (FIG. 1) when the convex portion 25a and the concave portion 11d are viewed in a plane. For example, the concave portion 11d is formed in a shape complementary to the convex portion 25a.

In the present embodiment, since the sealing portion 15A is a bent flow path including the ridge-shaped flow path portion, the sealing portion 15A can be formed to be longer, compared to the configuration of the first example. Therefore, even when dust or a foreign substance enters the sealing portion 15A, the dust or foreign substance needs to travel a longer distance to reach the cavity 18. This makes it difficult for dust or a foreign substance to enter the cavity 18.

Third Example

Figure 6:
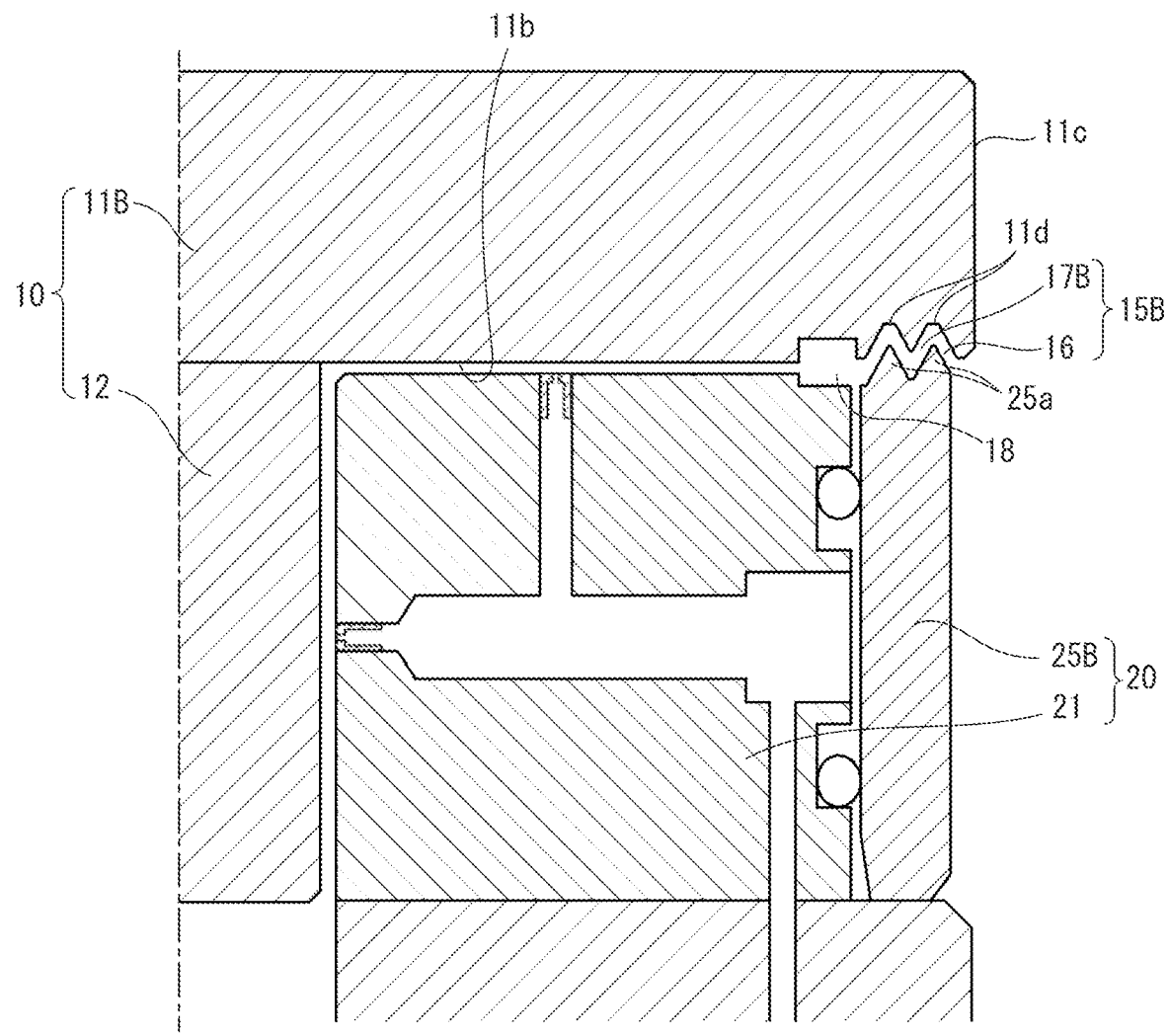
FIG. 6 is a cross-sectional view showing a configuration of the third example.

FIG. 6 is a cross-sectional view showing a configuration of the third example. A rotary table S120 of FIG. 6 has a sealing portion 15B having a shape different than that of the sealing portion 15A of the second example. The other configurations are similar to those of the second example.

As shown in FIG. 6, the sealing portion 15B may include a plurality of ridge-shaped flow path portions. Specifically, the sealing portion 15B includes two ridge-shaped flow path portions. More specifically, the sealing portion 15B is formed by a plurality of convex portions 25a on an upper surface of a sleeve 25B, and a plurality of concave portions 11d on a lower surface 11b of a thrust plate 11B. The plurality of convex portions 25a are annular convex portions formed concentrically, and the plurality of concave portions 11d are annular concave portions formed concentrically.

In the present embodiment, since the sealing portion 15B is formed as a bent flow path including a plurality of ridge-shaped flow paths, the sealing portion 15B can be formed to be longer, compared to the second example, and therefore it is possible to prevent the entry of dust or a foreign substance more effectively.

Modified Example

Figure 7:
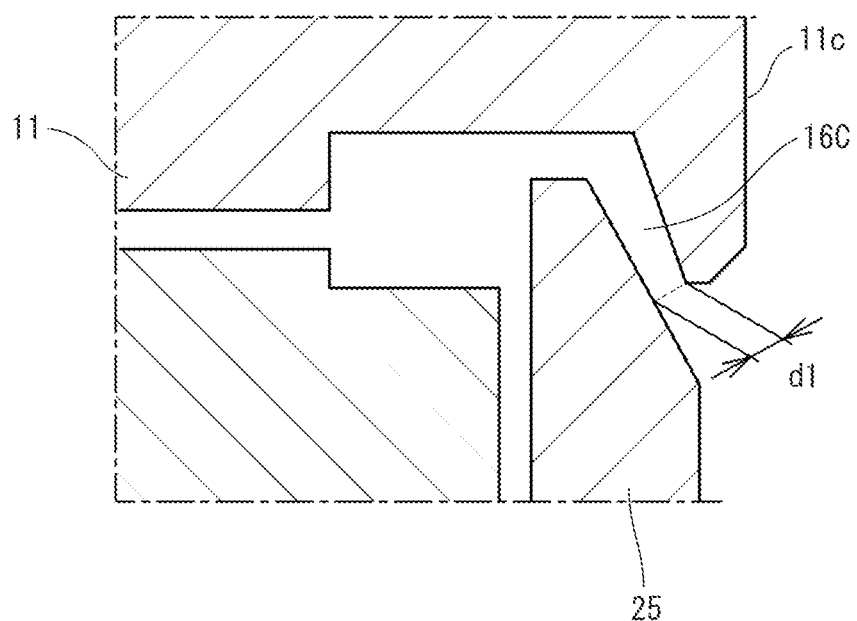
FIG. 7 is a cross-sectional view showing a configuration of a rotary table according to a modified example.

FIG. 7 is a cross-sectional view showing a configuration of a rotary table according to a modified example. In the configuration of FIG. 7, similarly to the above-described embodiment, an inclined flow path 16C is formed between the thrust plate 11 and the sleeve 25. In this inclined flow path 16C, a flow path width d1 closer to the outer peripheral surface 11c of the thrust plate 11 is formed narrower than a flow path width inside the inclined flow path 16C. In this manner, according to a configuration in which the flow path width d1 in the vicinity of the inlet is narrow and the flow path width gradually increases (i.e., a configuration in which a cross-sectional area of the flow path gradually increases), as compared with a configuration in which the flow path width remains at the flow path width d1 throughout, the entry of liquid caused by the capillary force is less likely to occur. Therefore, it is possible to prevent the entry of dust or a foreign substance more effectively.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A dustproof seal structure comprising:
   a rotor assembly having a disc-shaped thrust plate and a columnar rotor provided on a lower surface of the thrust plate;
   a stator assembly rotatably supporting the rotor assembly, wherein the stator assembly forms a horizontal thrust aerostatic bearing between the lower surface of the thrust plate and an upper surface of the stator assembly when compressed air is supplied between the lower surface of the thrust plate and the upper surface of the stator assembly, wherein
   the thrust plate and the stator assembly form a sealing portion through which compressed air flows, at a position radially outward from the thrust aerostatic bearing, and
   the sealing portion includes an inclined flow path that extends upwardly from an outer peripheral surface of the thrust plate toward an inside in a radial direction.

2. The dustproof seal structure according to claim 1, wherein
   the thrust plate and the stator assembly form a cavity that communicates with the sealing portion at a position between the thrust aerostatic bearing and the sealing portion, and
   a lower surface of the cavity is lower than the upper surface of the stator assembly forming the thrust aerostatic bearing.

3. The dustproof seal structure according to claim 2, wherein
   the outer peripheral surface of the thrust plate is positioned radially outward from the inclined flow path.

4. The dustproof seal structure according to claim 2, wherein
   the thrust plate and the stator assembly are provided such that the compressed air discharged from the thrust aerostatic bearing flows into the sealing portion.

5. The dustproof seal structure according to claim 2, wherein
   the stator assembly includes:
   a stator forming a recessed portion that houses the rotor; and
   a sleeve disposed outside the stator, wherein
   the sealing portion is formed between an upper surface of the sleeve and the lower surface of the thrust plate.

6. The dustproof seal structure according to claim 5, wherein
   the sealing portion has a bent flow path including at least one ridge-shaped flow path portion, when viewing a vertical cross section of the sealing portion, and
   the inclined flow path is formed in a portion of the bent flow path.

7. The dustproof seal structure according to claim 6, wherein
   a plurality of convex portions are formed on the upper surface of the sleeve,
   a plurality of concave portions having a cross-sectional shape complementary to the convex portions are formed on the lower surface of the thrust plate, and
   the plurality of convex portions and the plurality of concave portions form a plurality of the ridge-shaped flow path portions.

8. The dustproof seal structure according to claim 2, wherein
   a highest portion on the upper surface of the sleeve is located above the thrust aerostatic bearing.

9. The dustproof seal structure according to claim 2, wherein
   a water-repellent coating layer is formed on at least a portion of a region of the thrust plate facing the sealing portion or a region of the stator assembly facing the sealing portion.

10. The dustproof seal structure according to claim 1, wherein
    the outer peripheral surface of the thrust plate is positioned radially outward from the inclined flow path.

11. The dustproof seal structure according to claim 1, wherein
    the thrust plate and the stator assembly are provided such that the compressed air discharged from the thrust aerostatic bearing flows into the sealing portion.

12. The dustproof seal structure according to claim 1, wherein
    the stator assembly includes:
    a stator forming a recessed portion that houses the rotor; and
    a sleeve disposed outside the stator, wherein
    the sealing portion is formed between an upper surface of the sleeve and the lower surface of the thrust plate.

13. The dustproof seal structure according to claim 12, wherein
    the sealing portion has a bent flow path including at least one ridge-shaped flow path portion, when viewing a vertical cross section of the sealing portion, and
    the inclined flow path is formed in a portion of the bent flow path.

14. The dustproof seal structure according to claim 13, wherein
    a plurality of convex portions are formed on the upper surface of the sleeve,
    a plurality of concave portions having a cross-sectional shape complementary to the convex portions are formed on the lower surface of the thrust plate, and
    the plurality of convex portions and the plurality of concave portions form a plurality of the ridge-shaped flow path portions.

15. The dustproof seal structure according to claim 1, wherein
    a highest portion on the upper surface of the sleeve is located above the thrust aerostatic bearing.

16. The dustproof seal structure according to claim 1, wherein
    a water-repellent coating layer is formed on at least a portion of a region of the thrust plate facing the sealing portion or a region of the stator assembly facing the sealing portion.

* * * * *